(12) United States Patent
Buss

(10) Patent No.: US 6,457,301 B1
(45) Date of Patent: Oct. 1, 2002

(54) TRIM ASSEMBLY FOR RIDING LAWNMOWER

(76) Inventor: Richard T. Buss, 8516 W. Colette La., Hickory Hills, IL (US) 60457

( * ) Notice: Subject to any disclaimer, the term of this patent is extended or adjusted under 35 U.S.C. 154(b) by 0 days.

(21) Appl. No.: 09/849,427

(22) Filed: May 4, 2001

(51) Int. Cl.[7] .......................... A01D 34/84; A01D 34/64
(52) U.S. Cl. .......................... 56/12.7; 56/11.8; 56/14.7; 56/DIG. 22
(58) Field of Search ................................. 56/12.7, 13.6, 56/14.9, 15.5, 15.7, 15.8, 15.9, 17.1, 17.5, DIG. 9, 11.3, DIG. 22, 11.8, 14.7; 192/224, 224.1

(56) References Cited

U.S. PATENT DOCUMENTS

| | | | |
|---|---|---|---|
| 731,588 A | * | 6/1903 | Meinhard ................... 192/244 |
| 3,531,922 A | * | 10/1970 | Hansen ....................... 56/13.7 |
| 3,590,564 A | * | 7/1971 | Clifford ................... 56/10.2 R |
| 3,984,967 A | * | 10/1976 | Jones ......................... 192/3.63 |
| D311,009 S | | 10/1990 | Wilkins |
| 5,035,107 A | | 7/1991 | Scarborough |
| 5,040,360 A | | 8/1991 | Meehleder |
| 5,048,276 A | * | 9/1991 | Miller ......................... 56/13.7 |
| 5,167,108 A | | 12/1992 | Bird |
| 5,560,189 A | | 10/1996 | Devillier et al. |
| 5,966,914 A | | 10/1999 | Reents |

FOREIGN PATENT DOCUMENTS

GB         2140265 A    * 11/1984

* cited by examiner

*Primary Examiner*—Thomas B. Will
*Assistant Examiner*—Meredith Petravick

(57) ABSTRACT

A trim assembly for riding lawnmower for trimming areas adjacent to lawnmower. The trim assembly for riding lawnmower includes a mounting attached to a perimeter wall of a blade shield mounted to a lawnmower. The device is positioned away from a body of the lawnmower. A cylinder is rotatably coupled to the mounting and orientated in a generally vertical orientation. A second pulley is mounted on an upper end of the cylinder. A disc is attached to a lower end of the cylinder. A belt extends around and frictionally engages a first pulley, mechanically coupled to a motor on the lawnmower, and the second pulley for rotating the second pulley and the cylinder attached thereto.

6 Claims, 3 Drawing Sheets

TRIM ASSEMBLY FOR RIDING LAWNMOWER

BACKGROUND OF THE INVENTION

1. Field of the Invention

The present invention relates to lawn trimming devices and more particularly pertains to a new trim assembly for riding lawnmower for trimming areas adjacent to lawnmower.

2. Description of the Prior Art

The use of lawn trimming devices is known in the prior art. More specifically, lawn trimming devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,167,108; U.S. Pat. No. 5,035,175; U.S. Pat. No. 5,966,914; U.S. Pat. No. 5,560,189; U.S. Pat. No. 5,040,360; and U.S. Des. Pat. No. 311,009.

While these devices fulfill their respective, particular objectives and requirements, the aforementioned patents do not disclose a new trim assembly for riding lawnmower. The inventive device includes a mounting attached to a perimeter wall of a blade shield mounted to a lawnmower. The device is positioned away from a body of the lawnmower. A cylinder is rotatably coupled to the mounting and orientated in a generally vertical orientation. A second pulley is mounted on an upper end of the cylinder. A cutting means is attached to a lower end of the cylinder. A belt extends around and frictionally engages a first pulley, mechanically coupled to a motor on the lawnmower, and the second pulley for rotating the second pulley and the cylinder attached thereto.

In these respects, the trim assembly for riding lawnmower according to the present invention substantially departs from the conventional concepts and designs of the prior art, and in so doing provides an apparatus primarily developed for the purpose of trimming areas adjacent to lawnmower.

SUMMARY OF THE INVENTION

The present invention provides a new trim assembly for riding lawnmower construction wherein the same can be utilized for trimming areas adjacent to lawnmower.

The general purpose of the present invention, which will be described subsequently in greater detail, is to provide a new trim assembly for riding lawnmower apparatus and method which has many of the advantages of the lawn trimming devices mentioned heretofore and many novel features that result in a new trim assembly for riding lawnmower which is not anticipated, rendered obvious, suggested, or even implied by any of the prior art lawn trimming devices, either alone or in any combination thereof.

To attain this, the present invention generally comprises a mounting attached to a perimeter wall of a blade shield mounted to a lawnmower. The device is positioned away from a body of the lawnmower. A cylinder is rotatably coupled to the mounting and orientated in a generally vertical orientation. A second pulley is mounted on an upper end of the cylinder. A cutting means is attached to a lower end of the cylinder. A belt extends around and frictionally engages a first pulley, mechanically coupled to a motor on the lawnmower, and the second pulley for rotating the second pulley and the cylinder attached thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trim assembly for riding lawnmower apparatus and method which has many of the advantages of the lawn trimming devices mentioned heretofore and many novel features that result in a new trim assembly for riding lawnmower which is not anticipated, rendered obvious, suggested, or even implied by any of the prior art lawn trimming devices, either alone or in any combination thereof.

It is another object of the present invention to provide a new trim assembly for riding lawnmower which may be easily and efficiently manufactured and marketed.

It is a further object of the present invention to provide a new trim assembly for riding lawnmower which is of a durable and reliable construction.

An even further object of the present invention is to provide a new trim assembly for riding lawnmower which is susceptible of a low cost of manufacture with regard to both materials and labor, and which accordingly is then susceptible of low prices of sale to the consuming public, thereby making such trim assembly for riding lawnmower economically available to the buying public.

Still yet another object of the present invention is to provide a new trim assembly for riding lawnmower which provides in the apparatuses and methods of the prior art some of the advantages thereof, while simultaneously overcoming some of the disadvantages normally associated therewith.

Still another object of the present invention is to provide a new trim assembly for riding lawnmower for trimming areas adjacent to lawnmower.

Yet another object of the present invention is to provide a new trim assembly for riding lawnmower which includes a mounting attached to a perimeter wall of a blade shield mounted to a lawnmower. The device is positioned away from a body of the lawnmower. A cylinder is rotatably coupled to the mounting and orientated in a generally vertical orientation. A second pulley is mounted on an upper end of the cylinder. A cutting means is attached to a lower end of the cylinder. A belt extends around and frictionally engages a first pulley, mechanically coupled to a motor on the lawnmower, and the second pulley for rotating the second pulley and the cylinder attached thereto.

Still yet another object of the present invention is to provide a new trim assembly for riding lawnmower that has an actuator that is positioned for easy engagement by the foot of the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
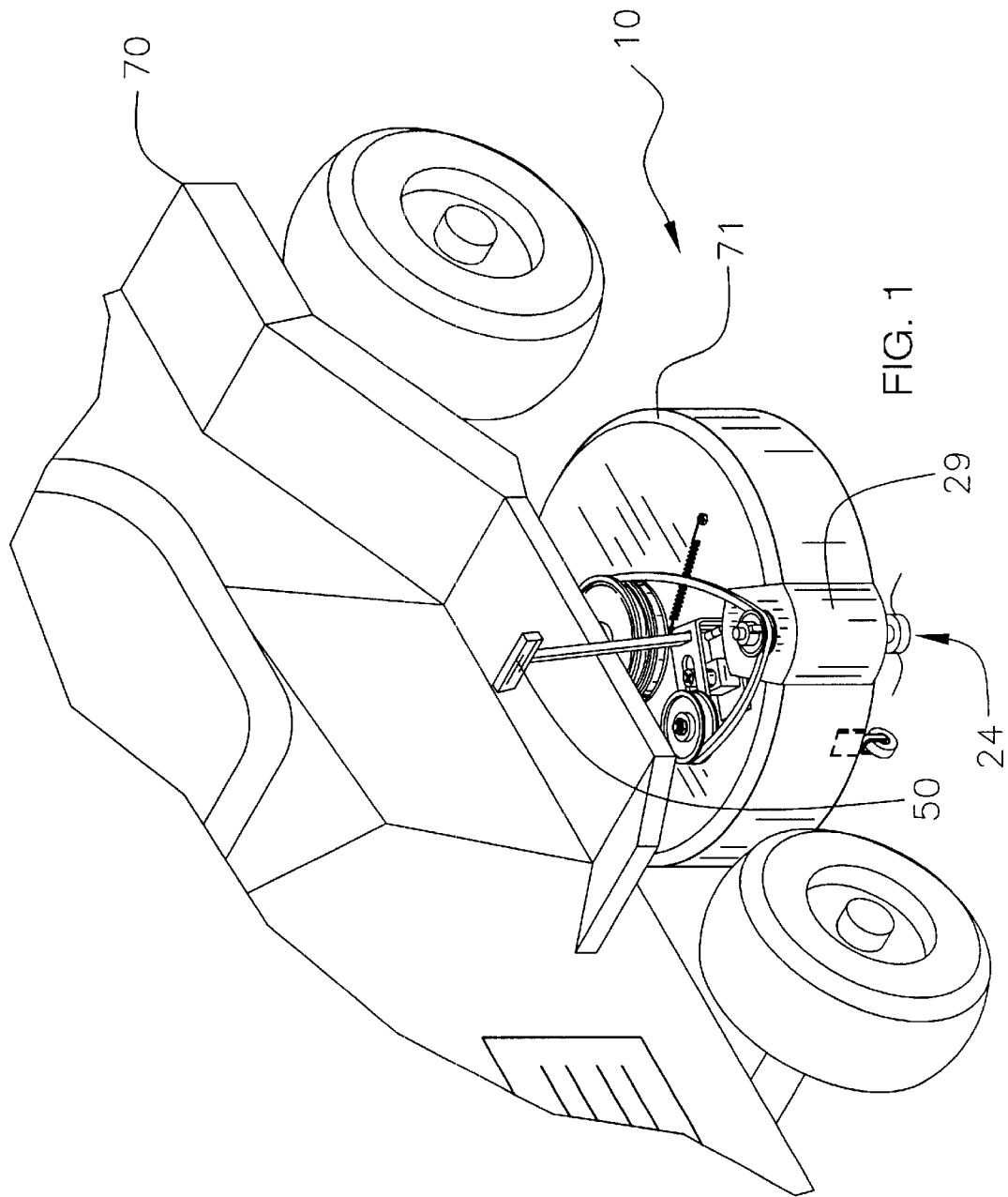
FIG. 1 is a schematic perspective view of a new trim assembly for riding lawnmower according to the present invention.
Figure 2:
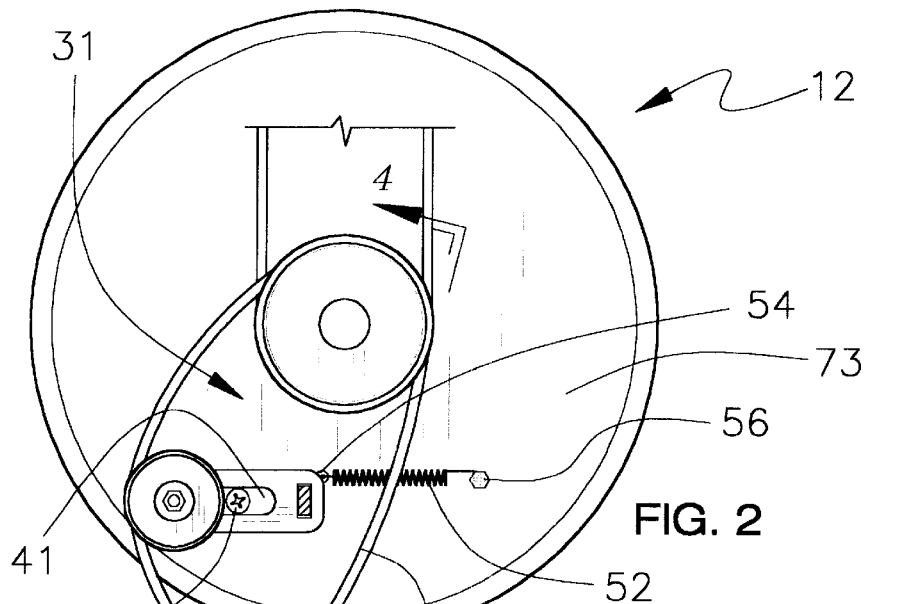
FIG. 2 is a schematic top view of the present invention.
Figure 3:
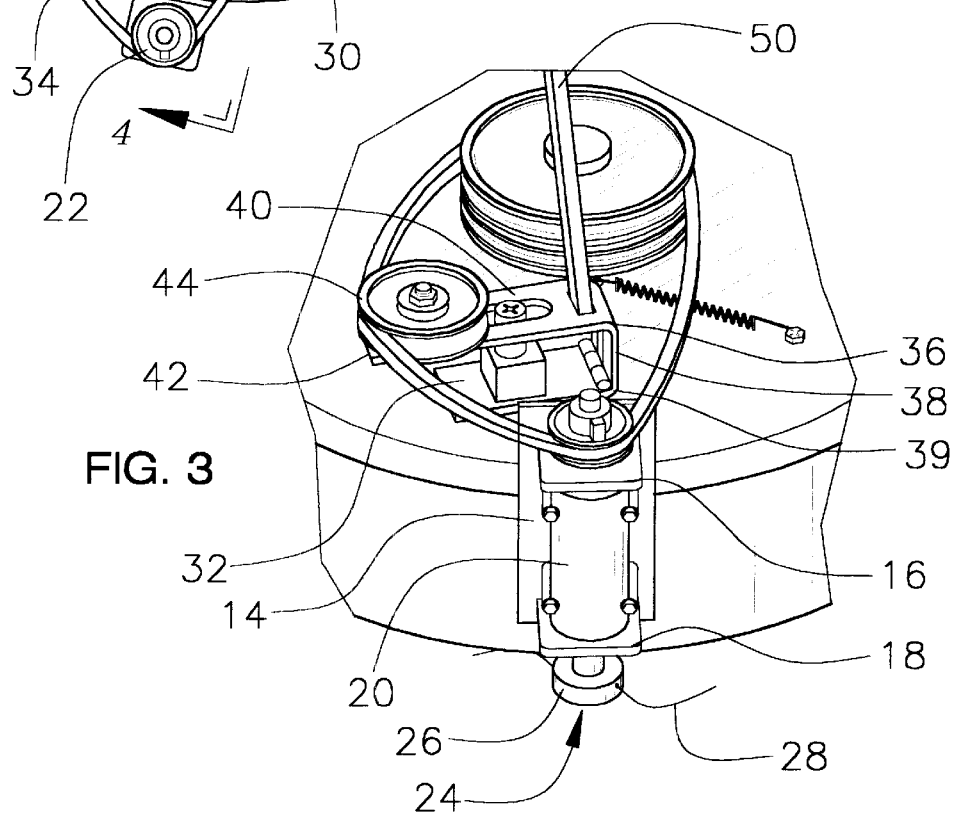
FIG. 3 is a schematic perspective view of the present invention.
Figure 4:
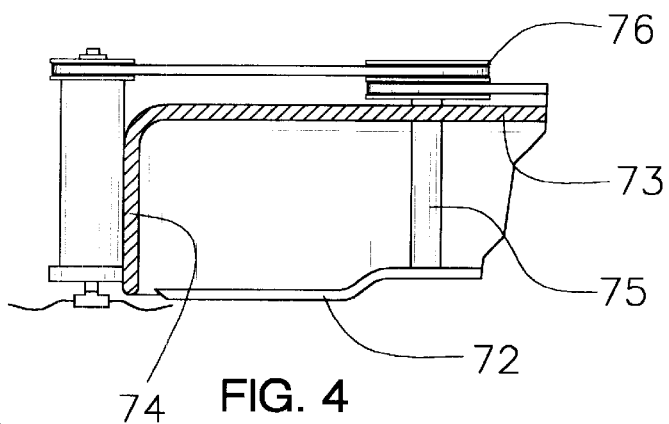
FIG. 4 is a schematic cross-sectional view taken along line 4—4 of FIG. 2 of the present invention.
Figure 5:
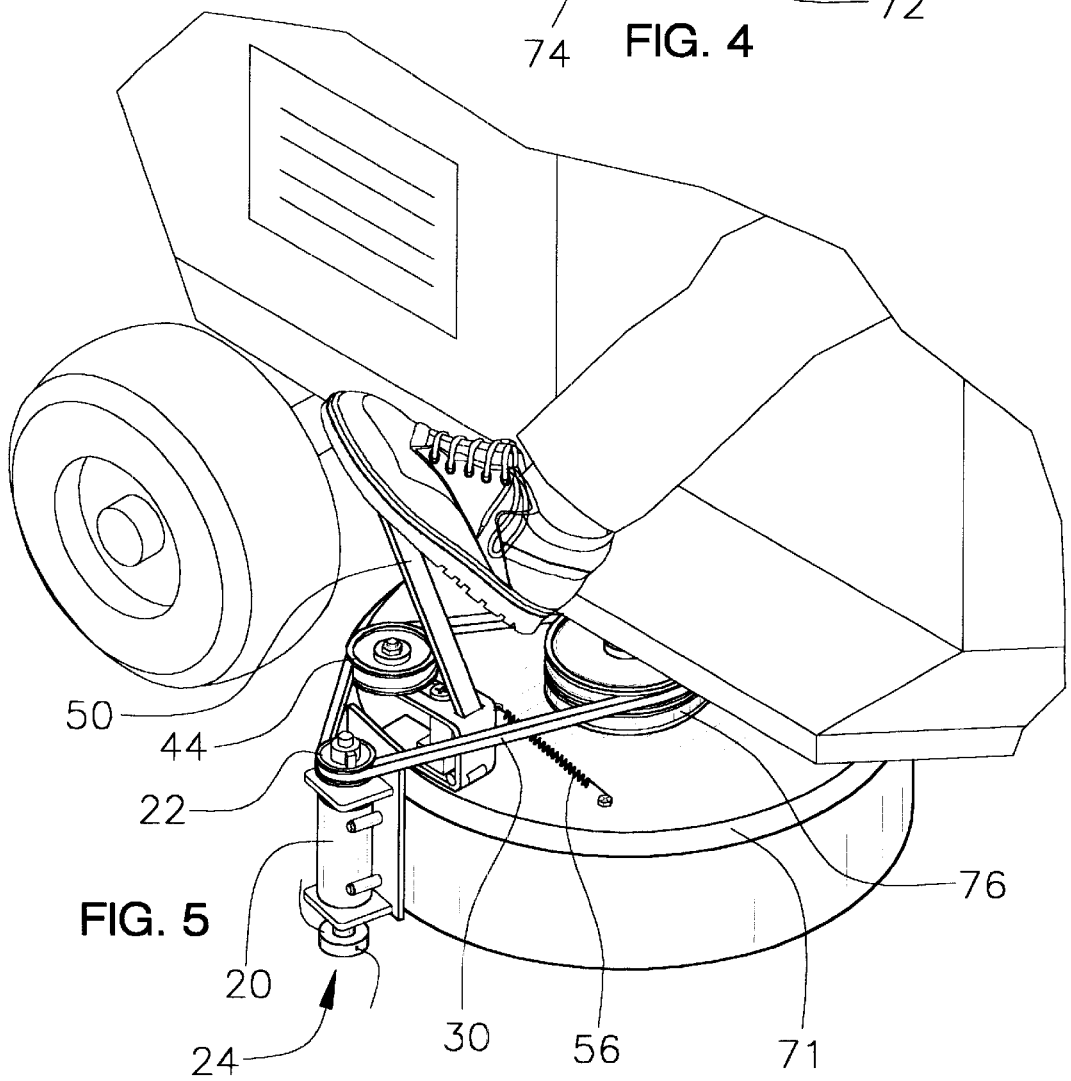
FIG. 5 is a schematic perspective view of the present invention.

With reference now to the drawings, and in particular to FIGS. 1 through 5 thereof, a new trim assembly for riding lawnmower embodying the principles and concepts of the present invention and generally designated by the reference numeral 10 will be described.

As best illustrated in FIGS. 1 through 5, the trim assembly for riding lawnmower 10 generally comprises an assembly for mounting to a riding lawnmower 70. The lawnmower 70 has a blade shield 71 generally covering a blade 72. The blade shield 71 has an upper wall 73 and a perimeter wall 74 extending downward from the upper wall 73. The blade 72 is mounted to an axle 75 mechanically coupled to a motor of the lawnmower 70. The axle 75 extends through and is attached to a first pulley 76 such that the first pulley 76 is rotated by the axle 75. The blade shield 71 is positioned between the first pulley 76 and the blade 72.

The assembly 12 includes a mounting 14 attached to the perimeter wall 74 and positioned away from a body of the lawnmower 70. The mounting 14 includes a pair of horizontal plates spaced horizontally with respect to each other such that a top plate 16 and bottom plate 18 are defined.

A cylinder 20 extends through and is rotatably coupled to the plates 16, 18. A second pulley 22 is mounted on a top end of the cylinder 20 and is positioned above the top plate 16. A cutting means 24 is attached to a bottom end of the cylinder 20 and is positioned below the bottom plate 18. The cutting means 24 includes a disc 26 having a plurality of filaments 28 attached thereto and extending away therefrom. The filaments 28 are a resiliently elastic material comprising a plastic. The cutting device 24 being of a conventional kind found on trimming devices. A belt 30 extends around the first 76 and second 22 pulleys. A housing 29 is positioned around and generally covering the cylinder 20 from the top 16 to the bottom 18 plate.

A belt engaging device 31 comprises a base wall 32 mounted to the upper wall 73 of the blade shield 71. The base wall 32 is positioned generally between the axle 75 and the cylinder 20. A guide member 34 is attached to and extends upwardly from the base wall 32. A bracket 36 has a first plate 38 and a second plate 40 attached together at their ends at a generally perpendicular angle such that the bracket generally has an L-shape. The first plate 38 has a free end 39 hingedly coupled to an edge of the base wall 32 such that the second plate 40 extends over the base wall 32. The second plate 40 has a slot 41 thereon extending between the first plate 38 and a free end 42 of the second plate 40. The guide member 34 extends upwardly through the slot 41. The second plate 40 extends away from the first plate 38 at a generally perpendicular angle with respect to a line extending between the axle 75 and cylinder 20.

A third pulley 44 is rotatably coupled to an upper side of the second plate 40 and is positioned generally adjacent to the free end 42 of the second plate 40. The belt 30 extends around the third pulley 44 in a generally non-engaged manner.

An actuator 50 is coupled to and extends upwardly from the second plate 40. The actuator 50 may be engaged such that the bracket 36 pivots toward the third pulley 44 such that the third pulley 44 frictionally engages the belt 30 and the belt frictionally engages the first 76 and second 22 pulleys.

A biasing means 52 biases the bracket 36 away from the third pulley 44. The biasing means 52 comprises a spring has a first end 54 coupled to the bracket 36 and a second end 56 coupled to the upper wall 73 of the blade shield 71.

In use, the lawnmower 70 is used as a conventional lawnmower. When the user nears an area adjacent to the lawnmower which the blade 72 can not reach, such as the areas adjacent to a fence, the assembly 10 is engaged and the cutting means 24 trims that area. The assembly 10 is engaged by the user pressing on the actuator 50 to make the belt 30 taught such that it frictionally engages each of the pulleys and the first pulley 76 rotates the second 22 and third 44 pulleys.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trimming assembly for mounting to a riding lawnmower, the lawnmower having a blade shield generally covering a blade, the blade shield having an upper wall and a perimeter wall extending downward from said upper wall, the blade being mounted to an axle mechanically coupled to a motor of the lawnmower, the axle extending through and attached to a first pulley such that said first pulley is rotated by said axle, said blade shield being positioned between said first pulley and said blade, said assembly comprising:

a mounting being attached to said perimeter wall and positioned away from a body of said lawnmower;

a cylinder being rotatably coupled to said mounting and orientated in a generally vertical orientation;

a second pulley being mounted on an upper end of said cylinder;

a cutting means being attached to a lower end of said cylinder;

a belt extending around said first and second pulleys; and a belt engaging device for selectively frictionally engaging said belt with said first and second pulleys;

wherein said belt engaging device includes:

a base wall being mounted to said upper wall of said blade shield, said base wall being positioned generally between said axle and said cylinder;

a bracket being hingedly coupled to said base wall;

a third pulley being rotatably coupled to said bracket such that said belt extends around said third pulley;

an actuator being attached to and extending upwardly from said bracket, wherein actuating said bracket frictionally engages said belt with said first, second and third pulleys;

a guide member being attached to and extending upwardly from said base wall; and said bracket having a first plate and a second plate attached together at their ends at a generally perpendicular angle such that said bracket generally has an L-shape, said first plate having a free end hingedly coupled to an edge of said base wall such that said second plate extends over said base wall, said second plate having a slot thereon extending between said first plate and a free end of said second plate, said guide member extending upwardly through said slot, said second plate extending away from said first plate at a generally perpendicular angle with respect to a line extending between said axle and cylinder.

2. The trimming assembly as in claim 1, wherein said mounting includes a pair of horizontal plates spaced horizontally with respect to each other such that a top plate and bottom plate are defined, said cylinder extending through and being rotatably coupled to said plates, said second pulley positioned above said top plate, said cutting means being positioned below said bottom plate.

3. The trimming assembly as in claim 1, wherein said cutting means includes a disc having a plurality of filaments attached thereto and extending away therefrom, said filament being a resiliently elastic material.

4. The trimming assembly as in claim 1, a housing being positioned around and generally covering said cylinder.

5. The trimming assembly as in claim 1, further including: a biasing means for biasing said bracket away from said third pulley, said biasing means comprising a spring having a first end coupled to said bracket and a second end coupled to said upper wall of said blade shield.

6. A trimming assembly for mounting to a riding lawnmower, the lawnmower having a blade shield generally covering a blade, the blade shield having an upper wall and a perimeter wall extending downward from said upper wall, the blade being mounted to an axle mechanically coupled to a motor of the lawnmower, the axle extending through and attached to a first pulley such that said first pulley is rotated by said axle, said blade shield being positioned between said first pulley and said blade, said assembly comprising:

a mounting being attached to said perimeter wall and positioned away from a body of said lawnmower, said mounting including a pair of horizontal plates spaced horizontally with respect to each other such that a top plate and bottom plate are defined;

a cylinder extending through and being rotatably coupled to said plates;

a second pulley being mounted on said cylinder and being positioned above said top plate;

a cutting means being attached to said cylinder and being positioned below said bottom plate, said cutting means including a disc having a plurality of filaments attached thereto and extending away therefrom, said filament being a resiliently elastic material comprising a plastic;

a belt extending around said first and second pulleys;

a housing being positioned around and generally covering said cylinder from said top to said bottom plate;

a belt engaging device comprising;

base wall being mounted to said upper wall of said blade shield, said base wall being positioned generally between said axle and said cylinder;

a guide member being attached to and extending upwardly from said base wall;

a bracket having a first plate and a second plate attached together at their ends at a generally perpendicular angle such that said bracket generally has an L-shape, said first plate having a free end hingedly coupled to an edge of said base wall such that said second plate extends over said base wall, said second plate having a slot thereon extending between said first plate and a free end of said second plate, said guide member extending upwardly through said slot, said second plate extending away from said first plate at a generally perpendicular angle with respect to a line extending between said axle and cylinder;

a third pulley being rotatably coupled to an upper side of said second plate and positioned generally adjacent to said free end of said second plate, said belt extending around said third pulley in a generally non-engaged manner;

an actuator being coupled to and extending upwardly from said second plate, wherein said actuator may be engaged such that said bracket pivots toward said third pulley such that said third pulley frictionally engages said belt and said belt frictionally engages said first and second pulleys; and a biasing means for biasing said bracket away from said third pulley, said biasing means comprising a spring having a first end coupled to said bracket and a second end coupled to said upper wall of said blade shield.

* * * * *